US009961686B2

(12) United States Patent
Andreoli-Fang et al.

(10) Patent No.: US 9,961,686 B2
(45) Date of Patent: May 1, 2018

(54) CONTEXTUAL AWARENESS ARCHITECTURE

(71) Applicant: Cable Television Laboratories, Inc., Louisville, CO (US)

(72) Inventors: Jennifer Andreoli-Fang, Boulder, CO (US); Vikas Sarawat, Broomfield, CO (US); Clarke Stevens, Littleton, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 195 days.

(21) Appl. No.: 14/788,698

(22) Filed: Jun. 30, 2015

(65) Prior Publication Data

US 2015/0382339 A1 Dec. 31, 2015

Related U.S. Application Data

(63) Continuation-in-part of application No. 13/910,081, filed on Jun. 4, 2013, now Pat. No. 9,100,360.

(60) Provisional application No. 61/665,376, filed on Jun. 28, 2012.

(51) Int. Cl.
| | |
|---|---|
| *H04W 72/04* | (2009.01) |
| *H04W 28/02* | (2009.01) |
| *H04W 28/20* | (2009.01) |
| *H04L 12/58* | (2006.01) |
| *H04W 4/00* | (2018.01) |
| *H04W 88/16* | (2009.01) |
| *H04W 4/02* | (2018.01) |
| *H04W 4/22* | (2009.01) |

(52) U.S. Cl.
CPC ......... *H04W 72/048* (2013.01); *H04L 51/38* (2013.01); *H04W 4/005* (2013.01); *H04W 4/008* (2013.01); *H04W 28/0268* (2013.01); *H04W 28/20* (2013.01); *H04W 4/027* (2013.01); *H04W 4/22* (2013.01); *H04W 88/16* (2013.01)

(58) Field of Classification Search
CPC .................. H04W 72/048; H04W 28/0268
USPC ............. 370/328, 329, 331, 338; 455/456.1, 455/456.2, 456.5
See application file for complete search history.

(56) References Cited

U.S. PATENT DOCUMENTS

| | | | |
|---|---|---|---|
| 6,359,902 B1 * | 3/2002 | Putzolu | H04N 7/17318 370/466 |
| 2002/0173295 A1 | 11/2002 | Nykanen | |
| 2004/0107219 A1 * | 6/2004 | Rosenberger | H04L 43/00 |
| 2004/0168088 A1 * | 8/2004 | Guo | H04L 12/2859 726/15 |

(Continued)

FOREIGN PATENT DOCUMENTS

JP        2007265050 A     * 10/2007

OTHER PUBLICATIONS

"Replacing Complex Internet VPN Networks"—Cybera, 4/11 https://www.cybera.com/pdfs/replacing-complex-internet-vpn-networks-case-study-kirklands.pdf.*

*Primary Examiner* — Randy Scott
(74) *Attorney, Agent, or Firm* — Great Lakes Intellectual Property, PLLC

(57) ABSTRACT

An architecture for collecting and managing contextual awareness data is contemplated. The architecture may be used to implement various policies as a function of the contextual awareness data, such as but not limited to implementing dwelling specific policies depending on the contextual awareness data indicating whether one or more users are presence within a dwelling.

18 Claims, 5 Drawing Sheets

(56) References Cited

U.S. PATENT DOCUMENTS

| | | | |
|---|---|---|---|
| 2008/0139222 A1* | 6/2008 | Falvo | H04M 3/42374 455/456.3 |
| 2008/0261630 A1* | 10/2008 | Wormald | H04M 1/72552 455/466 |
| 2009/0133081 A1 | 5/2009 | Sakai et al. | |
| 2010/0135178 A1 | 6/2010 | Aggarwal | |

* cited by examiner

CONTEXTUAL AWARENESS ARCHITECTURE

CROSS-REFERENCE TO RELATED APPLICATIONS

This application is a continuation-in-part of U.S. application Ser. No. 13/910,081, filed Jun. 4, 2013, which claimed the benefit of U.S. provisional application No. 61/665,376 filed Jun. 28, 2012, the disclosures and benefits of which are hereby incorporated in their entireties by reference herein.

TECHNICAL FIELD

The present invention relates to contextual awareness, such as but not limited necessary limited to architectures, systems and methods sufficient to facilitate implementing policy decisions as a function of contextual awareness data.

BACKGROUND

Some homes have broadband internet connectivity via a Cable Modem, DSL modem, or an Ethernet Passive Optical Network (EPON-ONU), and use a router gateway to allow multiple devices on the home network to inter-connect and connect to the internet. The router gateway may support a myriad of interfaces (e.g. Ethernet, Wi-Fi, Zigbee, Multimedia over Coax Alliance (MoCA), or Bluetooth) for the users to connect too. One non-limiting aspect of the present invention contemplates leveraging the 24/7, always-connected lifestyle led by many people and households to enable a modem or home routing gateway to facilitate uniquely capturing people's daily lives as contextual awareness data, and as a function thereof, to facilitate desired policies and/or controls.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
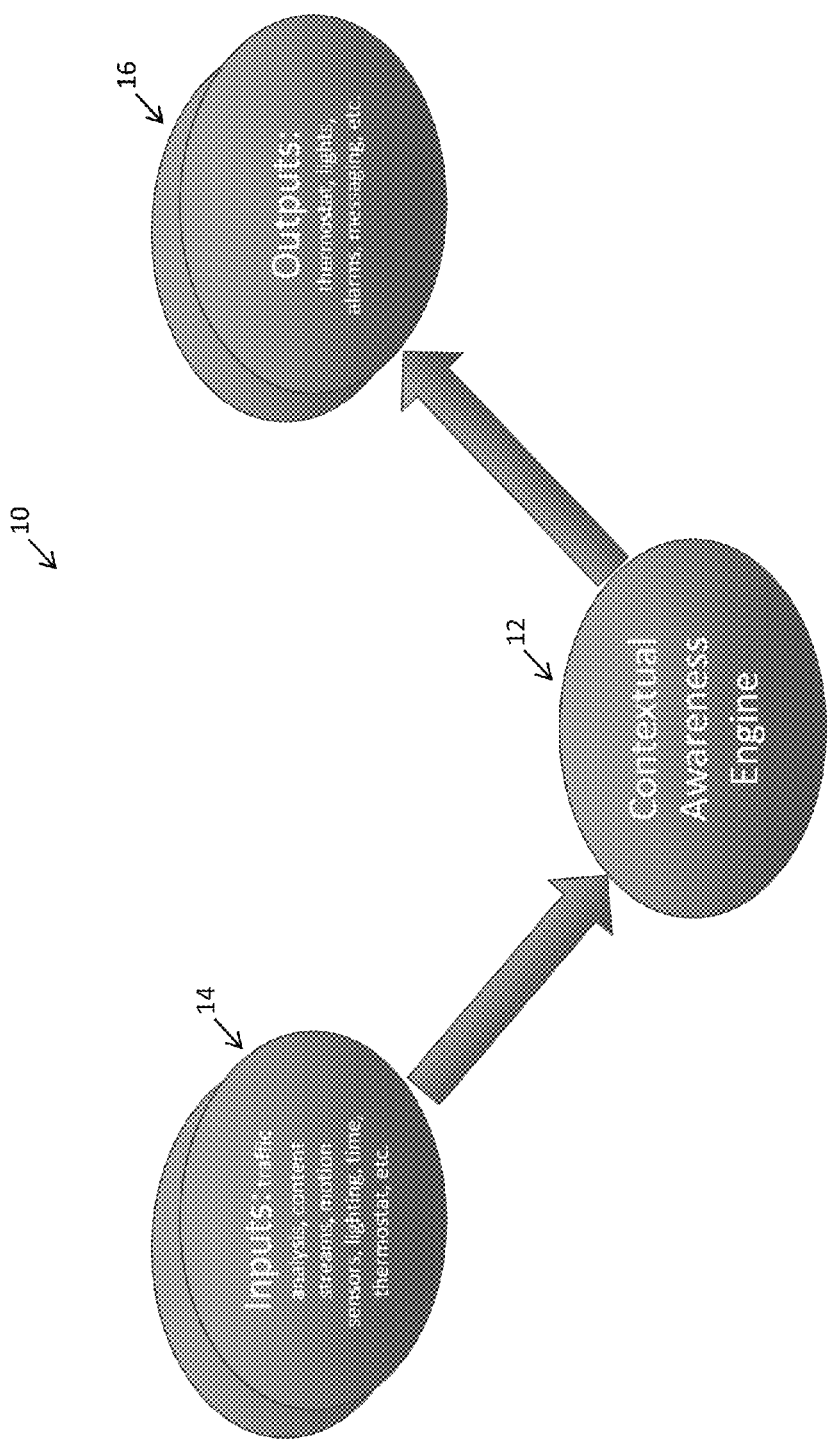
FIG. 1 illustrates a contextual awareness architecture in accordance with one non-limiting aspect of the present invention.

FIG. 1 illustrates a contextual awareness architecture 10 in accordance with one non-limiting aspect of the present invention. The architecture 10 may be configured to provide a framework for collecting and managing contextual data and using it to drive new categories of applications, such as with use of a contextual awareness engine 12. With various sensors becoming increasingly common in portable devices (e.g. smart phones) and the near ubiquitous connectivity of the Internet, the contextual awareness architecture 10 may be used to provide contextual awareness to applications in a consistent way and to provide the tools to enable contextual interaction. Contextual awareness can greatly enhance the utility of an application. A multi-service operator, such as but not limited to a cable television company, may utilize the contemplated architecture 10 to enhance the user experience and provide numerous services in a natural and intelligent way. A contextually aware application may provide not only a tremendously gratifying user experience, it may also allow a service provider to promote services, provide extremely specific advertising, and integrate services for improved customer retention.

This invention leverages sensors and data from a number of different sources, shown collectively as an input 14 to the contextual awareness engine 12, to provide an integrated experience through various outputs, shown collectively as an output 14 from the contextual awareness engine 12. The contextual awareness engine 12 may be an application, computer program product or other feature configured in the accordance with the present invention to facilitate the contemplated contextually aware operations. This architecture 10 may be used to leverage user-provided information (such as billing/service records, tuned channel, etc.) that are only known to authorized service providers and to do so using a consistent architecture to support various integrated tools required for contextual applications. With various sensors becoming increasingly common in portable devices (e.g. smart phones) and the near ubiquitous connectivity of the Internet, the contextual awareness architecture 10 may provide a framework for collecting and managing contextual data and using it to drive new categories of applications.

One non-limiting aspect of the present invention contemplates the contextual awareness architecture being sufficient to provide a disparate collection of data available from networked devices, a centrally managed network of service and data providers, and a secure authentication infrastructure where by these features may be leveraged to provide contextually aware services to users. The contextual awareness engine 12 may combine its knowledge of data, services and user information to provide a premium user experience. The contextual inputs 14 may include: content; metadata; history; analytics; personal profile, accounts; location; sensors (video, audio, motion, thermal, RFID, etc.); and other information. Additional features of the architecture 10 may include: an authentication, authorization and access engine to ensure user privacy, content security and information security across a network infrastructure; content delivery networks (CDN) to manage the warehousing and distribution of content in different formats to different devices over different network infrastructure(s); local and personal networks that include discoverable devices, services and information; a management infrastructure to handle deployment and ongoing maintenance of the various services; and a distributed application environment in which applications communicate across different networks and platforms and behave differently depending on contextual awareness. (e.g. A smart phone becomes a remote control in the living room, but becomes media player when the user leaves the house.)

Optionally, the contextual awareness engine 12 may be configured to accept all the contextual information and recognizes patterns in order to determine context. There is no specific limit to the number of inputs that can be monitored or the complexity and subtlety of the relationships that may be identified. The contextual awareness engine 12 may be configured to recognize and manage context and provide information to applications and services that are context aware. The contextual awareness generated in accordance with the present invention may be considered in terms of authentication, authorization and access to services where the presentation of a service may require various levels of authorization with respect to context. The contextual awareness may be recognized and dynamic such that context may be individual or associated with a group whereby the context may change as the members of the group change or various elements of the environment change (e.g. a new television program begins, new people join the group, the weather changes, etc.). The sharing of personal information, at an individual and/or group level, may be managed by the contextual awareness engine according to context.

Figure 2:
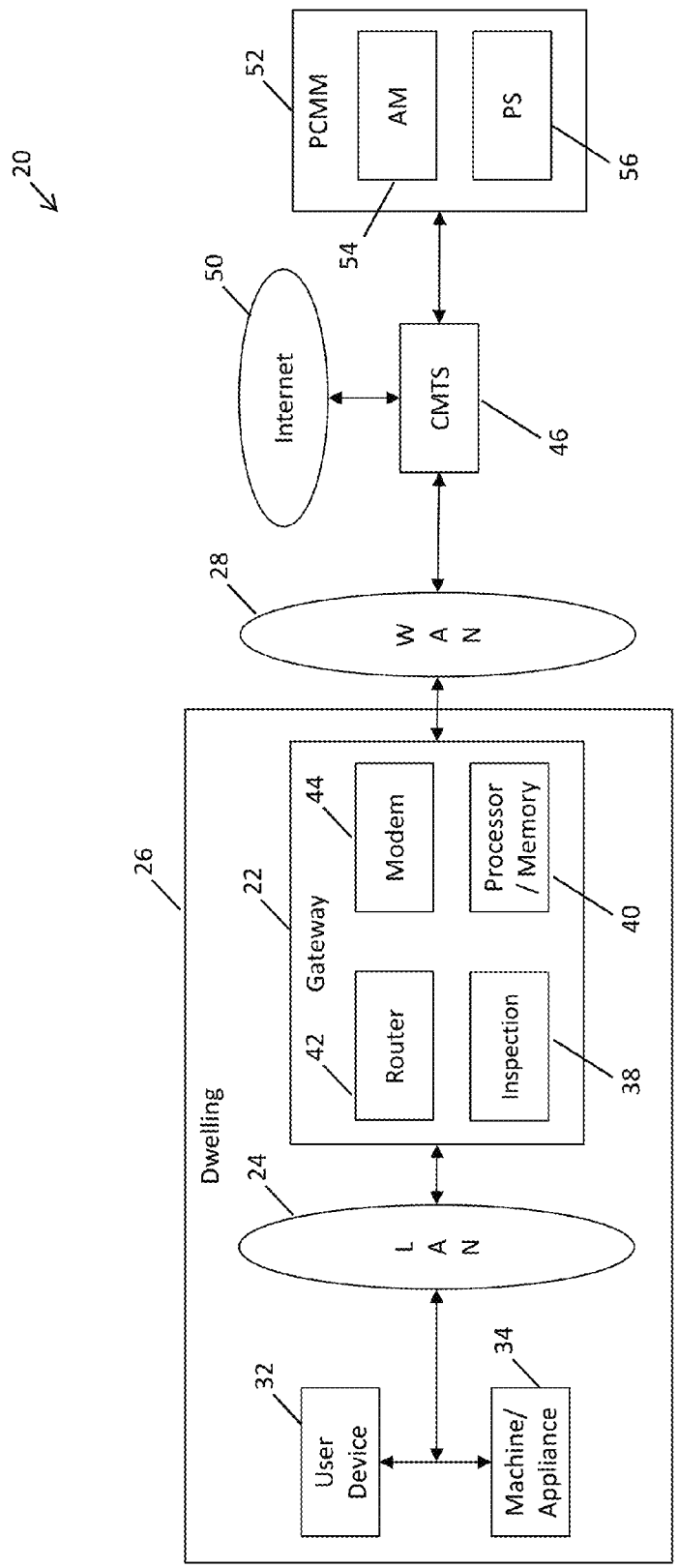
FIG. 2 illustrates a contextually aware system in accordance with one non-limiting aspect of the present invention.

FIG. 2 illustrates a contextually aware system 20 in accordance with one non-limiting aspect of the present invention. The system 20 illustrates a gateway 22 configured to facilitate interfacing signaling between a local area network (LAN) 24 associated with a dwelling 26 and a wide area network (WAN) 28 associated with an Internet service provider (ISP) or other service provider or multiple service operator (MSO), such as but not necessary limited to a cable television service provider, a cellular service provider, a digital subscriber line (DSL) service provider, a voice over Internet protocol (VoIP) service provider, a streaming media service provider, a gaming service provider or other type is service provider that relies upon data packet exchanges with the dwelling 26 in order to provide services to one or more subscribers/users. The services provided may facilitate exchanging data packets or other signaling sufficient to provide virtually any type of electronic service to the dwelling 26 and the users within the dwelling 16, including but not necessary limited to data services, television services, phone services, cellular services, VoIP, gaming, etc. The dwelling 26 may include any number of devices to facilitate access to such electronic content and is shown for exemplary non-limiting purposes to include a user device 32 and a machine or appliance 34 to facilitate accessing electronic services.

A single user device 32 is shown for exemplary non-limiting purposes as the present invention fully contemplates the system 20 including any number of user devices 32 within the dwelling 26. The user device 32 may be used to characterize one type of device relying upon human interaction in order to access services associated with the service provider and/or to access services or otherwise communicate signaling or data packets with other devices connected to the LAN 24. The user device 32, for example, may be a tablet, a computer, a mobile phone, a smart phone, a personal digital assistant (PDA), a television, a media terminal adapter (MTA), a set top box (STB), a Web device having a Web browser or other graphical user interface, etc. A single appliance 34 shown for exemplary non-purposes as the present invention fully contemplates the system 20 including any number of appliances 34 within the dwelling 26. The appliance 34 may be distinguished from the user device 32 at least in that human interaction may not be required in order to access services associated with the service provider and/or to access services or otherwise communicate signaling or data packets to other devices connected to the LAN. The appliance 34, for example, may be a refrigerator, a security system, a presence sensing system, a thermostat or a device within the dwelling 26 lacking a Web browser or other graphical user interface typically associated with user devices 32.

While the appliance 34 is shown to be distinct from the user device 32, the present invention fully contemplates the user device 32 being characterize as an appliance 34 and the appliance 34 being characterized as a user device 34. This interchangeable characterization of a device as one of the user device 32 and the appliance 34 may be based on its particular operating characteristics for a period of time, e.g., when the device is interacting with a human it may be characterized as a user device 32 and when the device is operating independently of human interaction, such as in response to pre-program triggering events or other automated or non-human controlled activities, it may be characterized as an appliance 34. The characterization of the device as being one of the user device 32 and the appliance 34 may be based on data packets originating therefrom during a period of time during which the devices is being characterized. The gateway 22 may include an inspection tool 38 configured to inspect data packets communicated over the LAN 24 in order to assess a traffic type or other information regarding the communicated data packets originating. The inspection tool 38 may generate inspection information sufficient to characterize the current operating state of devices as one of the user device 32 and the appliance 34.

The inspection tool 38 may be utilized to assign traffic types or other identifiers to the inspected data packets. The traffic type may be characterized as interactive traffic or machine traffic depending on whether the corresponding data packet originated from human activity or machine activity. The human activity may be characterized as that in which human interaction occurred proximate in time to transmission of the corresponding data packet, e.g., the human action triggered transmission of the data packet. The machine activity may be characterized as that which machine interaction occurred proximate time to transmission of the corresponding data packet, e.g., the machine action trigger transmission of the data packet. Additional criteria besides the activity occurring proximate in time to origination of a data packet may also be used to assess whether the originating device should be characterized as one of the user device 32 and the appliance 34. Additional criteria, for example, may be based on an assignment or designation associated with the device, e.g., the refrigerator may be assigned as an appliance and the tablet may be assigned as a user device. The assignments may be tracked in a database associated with the gateway 22, such as one stored within a corresponding processor/memory 40, and which may be identified as a function of source addressing information included the data packets, i.e., an assigned MAC or IP address.

The inspection tool 38 or other mechanism utilized to perform data packet inspection associated with characterizing the user device 32 and the appliance 34 may be included as part of or otherwise operational with a router 42 included in the gateway 26. The contemplated contextual awareness architecture 10 may make the gateway 26 the focal point where all the traffic, outgoing and incoming, to the internet or within the home, traverses. The router 42 may be configured to communicate with the user device 32 and the appliance 34 for which there are a number of potential options such as Wi-Fi, Zig-bee, or Bluetooth etc. The router 42 and/or inspection tool 38 may also use the following methods to determine whether the traffic is from a user or machine: the port (e.g. Wi-Fi vs Zig-bee) on which the traffic is transmitted or received; the type of content (e.g. websites) being visited; the level of user interactivity, protocol (e.g. peer to peer, SIP); and/or combination of content, server and protocols being used simultaneously. As described in more detail below, one purpose for identifying or indicating devices as one of the user device 32 and the appliance 34 may be useful in assessing whether a person is within the dwelling during a desired period of time. This assessing may be based on whether data communicated over the LAN or otherwise throughout the dwelling originates from human activity or machine activity, i.e., whether the data traffic is characterized as interactive traffic or machine traffic.

The present invention contemplates the gateway 26 facilitating data communications and other signaling necessary to facilitate a 24/7, always-connected lifestyle led by many people and households, which may be characterized with data packets being continuously exchanged over the LAN 24, even when a person is not actually present within the dwelling 26. The appliance 34, for example, may be configured to transmit data packets or provide other signaling exchanges when a person is not present, such as in response to activation of a home security system, performing firmware software updates, providing sensor data or other measurement metrics utilized to control dwelling subsystems (lighting systems, heating/cooling, etc.) or during other operational states where messaging may be triggered in the absence of human interaction. The gateway 26 may include a modem 44 or other service provider device to facilitate interfacing data packets between the router/LAN 24, 42 and the WAN 28. While not limited to cable transmissions, the system 20 is shown for exemplary non-limiting purposes with respect to the modem 44 being a cable modem configured to communicate with a cable modem termination system (CMTS) 46 where the CMTS 46 facilitates subsequent delivery of data packets to the Internet 50 or other resources associated with the service provider or otherwise in relationship with the service provider. Optionally, separate communications may be included to support certain services to the dwelling 26, such as television signaling carried to a STB or a device other than the modem 44. The service provider control or domain over the modem 22 and/or the gateway 22 may be leveraged to enable the service provider to uniquely identify and track activities at the dwelling 26 for use in facilitating contextually aware operations contemplated by the present invention.

The system 10 may include a PacketCable Multimedia (PCMM) device 52 to facilitate collecting and managing contextual awareness data, including the contextual awareness data generated with the inspection tool used to assess personal presence within the dwelling and/or other contextual awareness data collected by the user device 32, the appliance 34, sensors (not shown) or other features included within the dwelling 26. The PCMM device 52 may be particularly beneficial when the gateway 22 includes a cable modem or otherwise relies upon data packets exchanges carried over a cable or other wired medium. The illustrated used of the PCMM device 52 is not intended to limit the scope and contemplation of the present invention as other mechanisms, servers, etc. may be used to facilitated the contemplated operation, including those suitable for use with wireless or cellular communications between the gateway and the WAN 28 or other signal distributing system associated with the dwelling 26. The PCMM device 52 may be configured in accordance with the PacketCable™ Specification, Multimedia Specification, PKT-SP-MM-I06-110629, as published by Cable Television Laboratories, the disclosure of which is hereby incorporated by reference in its entirety.

As defined in the PacketCable™ Specification, the PCMM device 52 may include an Application Manager (AM) 54. The AM 54 may be a network entity that defines Session Control Domain (SCD) policies, coordinates subscriber-initiated requests for application sessions with access to the resources needed to meet those requests, and maintains application-level state. The AM 54 may reside on the MSO's network or it may reside outside this domain and interact with the MSO network via a particular trust relationship (typically defined by and enforced on the basis of a Service Level Agreement). Similarly, the AM 54 may be under the direct control of the operator or it may be controlled by a third party. Any given AM 54 may communicate with one or more Policy Servers (PS) 56 on the operator's network; likewise, one or more AMs 54 may communicate with any given PS 56 on the operator's network (so long as an appropriate trust relationship exists).

The AM 54 may communicate with the Application Server using a signaling protocol as defined in PacketCable Multimedia Web Service Interface Specification, PKT-SP-MM-WS-I03-091029, Oct. 29, 2009, Cable Television Laboratories, Inc., the disclosure of which is hereby incorporated by reference in its entirety. For Application Server requests the AM 54 authenticates and authorizes the Application Server requests based upon Service Control Domain policies. The AM 54 may communicate with a client via a signaling to authenticate and authorize client requests based on Service Control Domain policies. For client and Application Server requests that pass these checks, the AM 54 determines the particular QoS parameters necessary to deliver the service to the client, based on its knowledge of the requested service. It then sends a request for these resources to the appropriate PS 56, which may deny the request based on network or Resource Control Domain (RCD) policy or may pass the request on to the CMTS 46 for admission control and enforcement.

The policy management framework underlying PCMM 52 may be based on the work of the IETF's Resource Allocation Protocol (RAP) working group. Since the PS 56 is situated between the Application Manager and the CMTS 46, it simultaneously plays a dual role as a "proxy" for AM-initiated session requests and as a "sentry" for defining and enforcing Resource Control Domain policy. As described in IETF RFC 2753, A Framework for Policy-based Admission Control, January 2000, the disclosure of which is hereby incorporated by reference in its entirety, and in keeping with the PacketCable 1.x DQoS model, the disclosure of which is hereby incorporated by reference in its entirety, the PS 56 may serve as Policy Decision Point (PDP) in relation to the CMTS in that the PS implements MSO-defined authorization and resource-management procedures. Conversely, the PS assumes the role of Policy Enforcement Point (PEP) in relation to the AM as it proxies Gate Control messages to and from the CMTS 46.

The Application Manager may issue policy requests to the PS 56. The PS 56 acting as a "sentry" for these requests, and applies a set of policy rules that have been pre-provisioned by the MSO. Upon passing the checks, the PS 56 then acts as a "proxy" with respect to the AM 54 and the CMTS 46, forwarding the policy request and returning any associated response. Each policy request transaction must be processed individually. Policy decisions may be based on a number of factors, such as: parameters associated with the request and the status of available resources; identity of the particular client and associated profile information; application parameters; security considerations; and/or time-of-day. The functions of the PS 56 include: a policy decision request mechanism, invoked by the AM 54; a policy decision request 'policing' mechanism, enforcing installed Policy Rules; a policy decision delivery mechanism, used to install policy decisions on the CMTS 46; a mechanism to allow for the proxying of QoS management messages to the CMTS 46 on behalf of the AM 54; and/or an event recording interface to a Record Keeping Server that is used to log policy requests, which may in turn be correlated with network resource usage records Since the Policy Server functions as a proxy between the AM 54 and CMTS elements (with complementary client and server interfaces) some MSOs may elect to deploy multiple layers of PS 56 and to delegate certain policy decisions among these servers in order to satisfy requirements associated with scalability and fault-tolerance. The capabilities and interactivity of the AM 54 and the PS 56 may be useful in facilitating the contextual awareness data collection and management contemplated by the present invention. At least in this regard, the AM 54 may obtain messages from gateway 22 or user devices 32 and can take actions such as reserving QoS on access network 28 or home network 24 and the PS 56 may be used to receive instructions from AM 54, and deliver them to the CMTS 46, which observes the instructions such as QoS on the access network 24.

Figure 3:
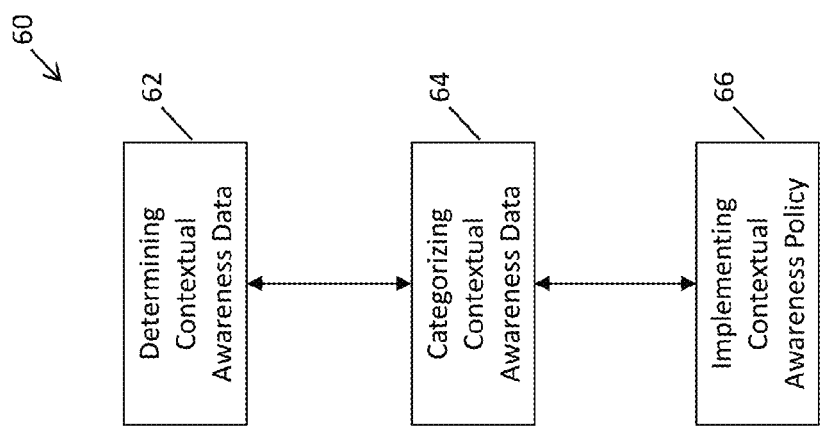
FIG. 3 illustrates a flowchart for a method controlling applications as a function of contextual awareness in accordance with one non-limiting aspect of the present invention.

FIG. 3 illustrates a flowchart 60 for a method controlling applications as a function of contextual awareness in accordance with one non-limiting aspect of the present invention. The method may be embodied in a computer-readable medium or a computer program product having non-transitory instructions, operable with a processor, to facilitate controlling the application according to collected and managed contextual awareness data. The non-transitory instructions may be included as part of the contextual awareness engine illustrated in FIG. 1 and/or one of the devices or features illustrating FIG. 2. The method is predominately described with respect to the gateway 22 illustrated in FIG. 2 being configured to generate contextual awareness data based upon data packets carried over the LAN 24. The contextual awareness data may then be analyzed with the inspection tool 38 or other feature included on the gateway 22, the PCMM 52 and/or another entity or device having sufficient capabilities to facilitate controlling the application or other device. While described with respect to the gateway 22, the present invention fully contemplates facilitating the contemplated contextual awareness operations outside of the gateway 22 and/or based on other information besides data packets carried over the LAN 24 or through another interface.

Block 62 relates to determining contextual awareness data. The contextual awareness data may be determined by inspecting or otherwise processing data packets carried over the LAN 24 or otherwise communicated from the user device 32 and/or the appliance 34. The data packets may be communicated locally for delivery over the LAN 24 and/or interfaced through the gateway 22 for delivery over the WAN 28. The data packets may correspond with any messaging, information or other transactions originating from one of the user device 32 and the appliance 34 in response to user interaction, automated processing or triggers and/or in response to messaging or queries transmitted from sources external to the LAN 24, such as from the PCMM 52 or other device having visibility into the dwelling 26, e.g., a smart grid controller configured to assess energy consumption within the dwelling 26 and to control appliances or other devices within the dwelling as a function thereof. One non-limiting aspect the present invention contemplates determining the contextual awareness data as a function of an inspection performed at the gateway 22. The inspection may be executed by performing a deep packet inspection of data packets interfaced through the gateway 22. Optionally, the data inspection may be limited to data carried in the clear or other non-private data.

The inspection tool 38 described with respect to FIG. 2 may be used to facilitate assessment of the data packets and the generation of contextual awareness data. The inspection tool 38 may be configured to generate contextual awareness data for the inspected data packets based on the content or information carried within the data packets and/or the mechanisms are means by which the data packets are carried over the LAN 24 or interfaced through the gateway 22. The contextual awareness data may be generated as new data and/or characteristics or other identifiers for the inspected data packets in a manner sufficient to provide context or other information regarding the events causing transmission of the corresponding data packets and/or in a manner otherwise representative of operating states of the user device 32 and the appliance 34. Optionally, the contextual awareness data may correspond with the data packet plus an awareness descriptor, such as but not necessarily limited to an assigned traffic type, source addressing, etc. and/or the contextual awareness data may be information generated from the inspected data packet but otherwise separate from the data packet.

As described above, the traffic type, source addressing and other characteristics of the data packets may be uncovered by inspecting the data packets (e.g., a header of the data packets) and/or the contents within the data packets (e.g., a payload of the data packets). The ability to perform packet inspection may be beneficial in capturing information about the operation of the transmitting/receiving one of the user device 32 and the appliance 34 from which the contextual awareness data may be generated. Optionally, additional information may be generated without necessarily having to inspect data packets, which may be beneficial in maintaining privacy of communications and/or ameliorating processing demands or other time-consuming processes that may be required in order to perform content-level packet inspection. One additional mechanism to generate contextual awareness data without inspecting data packets may be accomplished as a function of received signal strength indicator (RSSI) data generated as a function of wireless signaling over the LAN 24 (content inspection may be required when the data packets are communicated over a wire). The RSSI data may represent signal strengths of wireless signaling associated with the user device 32 and/or the appliance 34 transmitting data packets over the LAN 24.

The router 42 may be configured to generate the RSSI data as a function of data packets communicated over the LAN 24 or other signaling carried over the LAN 24 or associated with the user device 32 and the appliance 34. The RSSI data may be generated based on the data packets transmitted from the user device 32 and the appliance 34 in response to human interaction or machine control, i.e., as a function of the interactive and machine activity described above. The RSSI data may also be generated based on other data packets or signaling associated with the user device 32 and the appliance 34, such as maintenance messaging, polling messaging or other information exchange over the LAN 24 that may not have been triggered by machine applications executing on a device or user interacting with the device, such as but not necessary limited to stay alive signaling or other background communications between the router 42 and one or more wireless devices connected to the LAN 24. The RSSI data, and the other contextual awareness data, may be collected and managed over a period of time in order to assess movement and other characteristics within the dwelling 26. The RSSI data, in particular, may be beneficial in assessing whether a person is present within the home as the RSSI data for a particular device should varying in signal strength when a person is present within the home, e.g., as a function of the person moving the user device 32, opening or closing a door or undertaking other signal disrupting activity within the dwelling that causes signal strength variations to be reflected within the RSSI data.

Block 64 relates to categorizing the contextual awareness data determined in Block 62. The contextual awareness data may be categorized into any number of categories, which may vary depending on the information being collected and/or the operations intended to be performed based on the information. One non-limiting aspect the present invention contemplates categorizing the contextual awareness data into at least one of a first category and a second category. The first category may correspond with any contextual awareness data reflective of a person being present within the dwelling 26 and the second category may correspond with any contextual awareness data reflective of person being absent from the dwelling 26 or otherwise sufficiently indicative of the dwelling 26 likely being unoccupied by persons. The categorization of the contextual awareness data in this manner may be beneficial in allowing the gateway 22, the PCMM 52 or other processing device to identify operating states for the user device 32 and/or the appliances 34 based on data packets communicated therefrom, or the lack of data packets communicated therefrom, reflecting the likelihood that the dwelling 26 is unoccupied. Optionally, the contextual awareness data may be categorized into multiple categories.

Block 66 relates to implementing a contextual awareness policy based on the categorized contextual awareness data. The contextual awareness policy may relate to controlling an application, device or other feature within the dwelling 26 or otherwise associated with the dwelling 26 as a function of the contextual awareness data. One non-limiting aspect of the present invention contemplates controlling the gateway 22 as a function of the contextual awareness data, such as by defining the contextual awareness policy to include a first policy and a second policy selectable depending on whether the contextual awareness data is indicative of at least one person being present within the dwelling 26 or indicative of all persons being absent from the dwelling 26. The detection awareness policy may relate to optimizing packet transmission over the LAN 24, including defining first policy for optimizing data packet transmission over the LAN 24 for interactive data and defining the second policy for optimizing data packet transmission over the LAN 24 for machine-to-machine data. The data packet optimization may be performed by the gateway 22 scheduling interactive data or the data related to human traffic ahead of machine-to-machine data or other non-human traffic.

The contextual awareness policy may vary depending on operating capabilities of the gateway 22 and/or the other devices desired to be controlled as a function thereof. As such, the contextual awareness policies implementable in accordance with the present invention may vary greatly depending on the environment for which the contextual awareness data is collected. An additional contextual awareness policy may include defining the first policy to schedule gateway sleep according to a first sleep schedule and defining the second policy to schedule gateway sleep according to a second sleep schedule. The second sleep schedule having a longer sleeping period than the first sleep schedule in order to allow the gateway 22 and/or router 42 to remain in a sleep mode or to otherwise conserve energy and/or messaging during periods in time at which interactive traffic may be unavailable as the urgency to communicate machine traffic during those periods may be less critical. Another contextual awareness policy may include defining the first policy to allocate a first amount of wireless bandwidth on the LAN 24 for public access and a second amount of wireless bandwidth for private access and defining the second policy to allocate a third amount of wireless bandwidth for public access and a fourth amount of wireless bandwidth for private access. The third amount may be greater than the second amount and the fourth amount may be less than the second amount, thereby effectively increasing wireless bandwidth for private access when a person is likely to be within the dwelling 26 and increasing wireless bandwidth for public access when a person is unlikely to be within the dwelling 26.

Another contextual awareness policy may include defining the first policy for controlling the gateway 22 to transmit a present message over the LAN 24 and defining a second policy for controlling the gateway 22 to transmit an absent message over the LAN 24. The present message may be used to indicate presence of at least one person within the dwelling 26 and the absent message indicating absence of any person within the dwelling 26. The user device 32 and/or the appliance 34 may process the present and absent messages and adjust their individual operation as a function thereof. Optionally, the contextual awareness policy may include implementing more than one of the above-described policies or other non-described policies. The multi-policy approach may be beneficial in providing a check or a backup for a particular policy in order to insure a determination is not made in error or that any determinations are likely to be correct. One multi-policy strategy may include reliance of the RSSI data to initially assess device movement (person in dwelling) or sufficient signaling variations (a threshold may be set whereby sufficient variations indicate personal presence) and the traffic type may then be used to subsequently confirm the RSSI data determination, e.g., the signal strength variations may indicate personal absence when a person is present but signal strengths fail to vary due to lack of movement or other variations such that content assessment or traffic type may then be assessed to identify whether a user is triggering packet delivery.

Some homes have broadband internet connectivity via a Cable Modem, DSL modem, or a EPON ONU, and use a router gateway (GW) to allow multiple devices on the home network to inter-connect, and connect to the internet. The router GW supports myriad interfaces (e.g. Ethernet, Wi-Fi, Zig-bee, MOCA, or bluetooth) for the home users to connect too. The present invention contemplates leveraging a 24/7 always-connected lifestyle being led by many people and household with an enabled modem or home routing gateway to uniquely capture people's daily lives at any moment in time. The access network is a shared medium for the subscribers, and as such, resources are limited. The access network must be able to provide certain level of QoS for the subscribers. However, different classes of traffic require different QoS levels. For example, when the human user is at home using VoIP applications, delay and jitter are more important than throughput. But when the human user is not at home, M2M traffic from various sensors may require less bandwidth and less stringent delay requirement; and as such, freeing up the shared pipe for other subscribers who are present in their homes. However, certain home monitoring services may require more bandwidth.

This present invention contemplates several scenarios and proposes policies that can be applied to the access network, optimized based on the presence of a human user or M2M traffic. One scenario relates to a QoS policy on the access network for the home user after the context engine (e.g. can reside in home gateway) determines that a user is present inside the house. This may include the content engine sending an event to the ISP (e.g. cable operator) headend letting them know about the contextual information. An operator can assign different policies (e.g. security, QoS) based on this information. For example, if the user is not present inside the house, the Access network is assigned QoS and security policy 1 as oppose to QoS and security policy 2 which is more appropriate when the user is at home. The QoS policy 1 for example can be optimized for more machine-to-machine communication. The QoS policy 2 can be optimized for more interactive and multimedia type communication. An operator can use their existing Packet-Cable Multimedia infrastructure to receive events from subscriber home and then install appropriate QoS policies on the Access Network.

Figure 4:
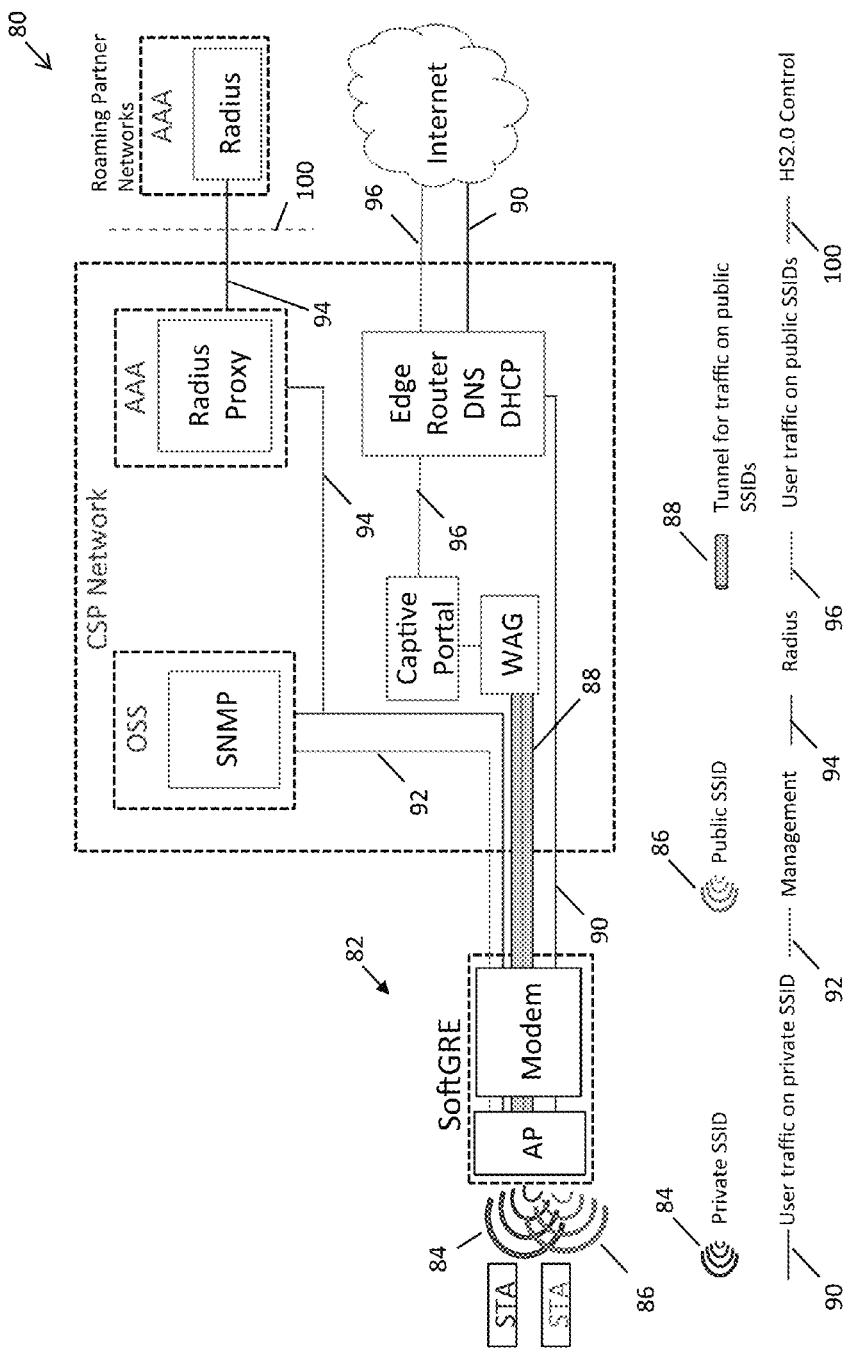
FIG. 4 illustrates a diagram for implementing a QoS policy on an access network in accordance with one non-limiting aspect of the present invention

FIG. 4 illustrates a diagram 80 of a contemplated scenario for implementing a QoS policy on an access network 82 when Community Wi-Fi is installed at a home in accordance with one non-limiting aspect of the present invention. In case of community Wi-Fi deployments where operators use Cable Modem (with Wi-Fi) to provide Wi-Fi services to public, use of presence data can be very effective in allocating bandwidth (QoS) for the public users. For example, when home user is not in the home 82, majority of bandwidth on the wireless network can easily be shared among public users. But when the user is home, operator may want keep majority of the wireless bandwidth allocated to the home users and only give a small proportion to the public user. The same policy can be applied to the case where operators provide backhaul services for cellular operators. For community Wi-Fi SSID, the traffic may be tunneled to a wireless access gateway (WAG) or other access gateway (AG) in the operator network. The WAG does not know about the presence or absence of the users in the home who are served using the private SSID. In majority of the community Wi-Fi networks, WAG is used for QoS policy enforcement. Without the knowledge of home user presence, the WAG implements a static policy. With our invention, the AP in the home can notify the WAG (Out of Band or Inband) about user presence and the WAG can change the QoS policy using this new information. The diagram 80 illustrates an architecture for Community Wi-Fi where a message exchange about the presence of users in the home is between the AP and the WAG. The WAG may use an internal process/software to change the QoS policy and enforces it on the traffic received from the AP in the tunnel.

The presence information can be used not only for QoS assignment but also to serve advertisements, including in-browser and other medium (e.g. TV). The contextual engine can also receive input from sensor installed at the door and windows. The information such as door or window open can then be sent as an event to the thermostat to either stop running or modulate temperature based on this new information. The same information can then be sent as an event to the ISP, which can then send messages (for example in-browser) to the subscriber notifying of the status of the window how it can impact the utility based on the price of energy and temperature that day. The contextual engine can also feed events to control system (such as Water valve), which for example can automatically shut down in case they detect any abnormality. For example a water valve can shut down automatically if it detect that too much water has been flowing for a long time and it received an event from the contextual engine that there is no user present inside the house. Furthermore, if the user subscribes to home monitoring with video feed services from the MSOs, the access network can apply appropriate and different QoS policy for the uplink traffic that transports the video stream over traffic from other subscribers.

Figure 5:
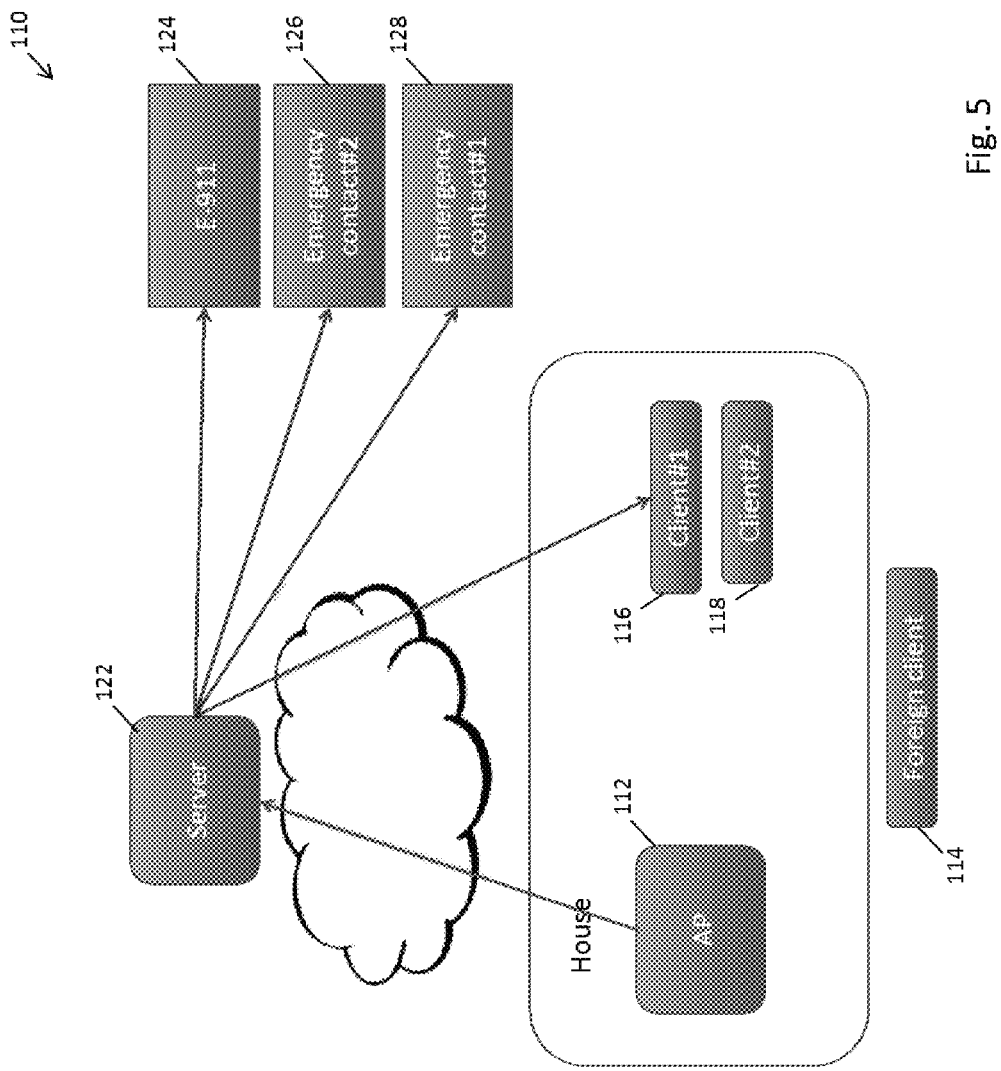
FIG. 5 illustrates a diagram for generating notifications in accordance with one non-limiting aspect of the present invention.

FIG. 5 illustrates a diagram 110 of a contemplated scenario for generating notifications when an unknown or foreign device in the house in accordance with one non-limiting aspect of the present invention. In addition to requesting change in QoS policies based on user presence or absence, a home GW 112 can also send notification to the user if it sees an unknown Wi-Fi client device 114 in the vicinity for more than a certain amount of time. Even thieves have smart phones today and many smart phones have Wi-Fi such that the present invention may provide an added security feature with the home GW 112 facilitating notifications for home users about the presence of a Wi-Fi client 114, 116, 118 in vicinity for more than certain amount of time. The time for which Home GW 112 should wait before notifying the user could either be user or operator configured. The AP 112 may be configured to monitor Wi-Fi devices 114, 116, 118 coming within its sensing range, by monitoring the periodic probing messages sent by Wi-Fi clients (e.g., Probe Request). AP 112 may report all new devices 114, 116, 118 it has not seen before, and who has been lingering in the sensing range greater than X time period, and will send a notification to device Y. User can configure X and Y. All these can be done via a simple software upgrade to the AP.

The AP 112 can detect a new client 114 that it has not seen before. If the client lingers around for X amount of time (configurable by the user), the AP notifies a server 122 in the cloud. The server 122 then notifies an authorized user of the device 114 and/or the event or conditions associated with its detection. The server 122 may then await for an approval or other instruction before taking further action. If the approval does not happen for Z amount of time, the server 122 contact a first level 124 of emergency contact fort approval and then waits for another configurable amount of time before sending it to an emergency contact#2 126. If not approval is received, the server notifies an e-911 contact 128 about a potential risk. If any of approval level users do not approve of the client being in the vicinity, then the server notifies all the registered devices and may also send an anomaly notification to e-911.

As supported above, one non-limiting aspect of the present invention contemplates the router and/or the inspection tool may be configured to monitor the traffic (outgoing and ingoing traffic) to determine whether any, or a particular family member is at home or not and notify the distributed home appliance devices (e.g. thermostat) about this determination. The distributed device can then use this information in combination with the information it received via other methods (e.g. short range, long range radio) to control the environment (e.g. temperature). The movement patterns of the devices (e.g. if the device is periodically moving then it's a family member moving since the machines are not going to move). Optionally, the home device may receive some of this contextual information from the video gateway (GW) (e.g. set top box) since video GW may be the focal point of the video network architecture in the home and there is a good likelihood that if family members are not active on Internet, they are watching TV.

Additionally, a mere presence of outgoing and ingoing traffic at the router may not automatically mean that a family member is present at home since the traffic could be generated for the machines inside the home, or as an automated task set up by a family member who is presently not awake. By using the WiFi received signal strength indicator (RSSI), the routing gateway can determine the distance (and potentially the room location) of user from the WiFi Access Point. This information can then be used to selectively control room-specific environment such as temperature or a vent. Household devices that require user interactions are inconvenient and burden-some to the users. This disclosure solves the problem of intelligently controlling household appliances without user's interaction, e.g., a contextual awareness policy can be defined to take any desired action or control of home appliances, user devices, etc.

One non-limiting aspect of the present invention contemplates the cable modem/DSL modem or home routing gateway the central controller because it has all the context information from household members. It makes the decision in a centralized manner. Smart temperature control may be implemented with a controllable thermostat, for example, as a one-off device that hosts intelligence. It will be much easier and cheaper to build intelligence into the router gateway, to re-use the information gathered by the router gateway and update software, than to do so on a small, processing-limited, distributed device such as a thermostat. The contextual engine can also receive input from sensors installed at a door and windows. The information such as door or window open can then be sent as an event to the thermostat to either stop running or modulate temperature based on this new information. The same information can then be sent as an event to the ISP which can then send messages (for example in-browser) to the subscriber notifying of the status of the window how it can impact the utility based on the price of energy and temperature that day.

The contextual engine can also feed events to control system (such as Water valve), which for example can automatically shut down in case they detect any abnormality. For example a water valve can shut down automatically if it detect that too much water has been flowing for a long time and it received an event from the contextual engine that there is no user present inside the house. After context engine (e.g. can reside in home gateway) determines that a user is present inside the house, it sends an event to the ISP (e.g. cable operator) headend letting them know about the contextual information. An operator can assign different policies (e.g. security, QoS) based on this information. For example, if the user is not present inside the house, the Access network is assigned QoS and security policy 1 as oppose to QoS and security policy 2 which meant for when the user is at home.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for facilitating contextual control of an access point (AP) gateway comprising:

an AP gateway configured to collect contextual awareness data associated with the AP gateway, the contextual awareness data being generated as a function of data packets communicated with the AP gateway;

an access gateway (AG) configured to facilitate control of the AP gateway according to at one or more policies depending of the collected contextual awareness data;

wherein the AP gateway analyzes the contextual awareness data to determine whether a user is present in a dwelling associated with the AP gateway at a selectable instance in time whereupon the AP gateway transmits a present message to the AG if the user is present and an absent message to the AG if the user is absent;

wherein the AG implements a first policy of the one or more policies in response to receipt of the present message and a second policy of the one or more policies in response to receipt of the absent message, the second policy being different than the first policy; and wherein the first policy is a quality of service (QoS) for controlling the AP gateway to allocate more bandwidth to interactive and multimedia type communication than to machine-to-machine communications and the second policy is a QoS for controlling the AP gateway to allocate more bandwidth to the machine-to-machine communications than the interactive and multimedia type communications, the interactive and multimedia type communications corresponding with first signaling exchanged between the AP gateway and a first one or more devices within the dwelling and the machine-to-machine communications corresponding with second signaling exchanged between the AP gateway and a second one or more devices within the dwelling, the first one or more devices being different than the second one of more devices and the first signaling occurring simultaneously with the second signaling.

2. The system of claim 1 wherein the AG sets the one or more policies to each differently control wireless communications simultaneously occurring between two or more devices and the AP gateway.

3. The system of claim 1 wherein the AG sets the one or more policies to each differently control wireless communications simultaneously occurring between two or more devices and the AP gateway without altering destinations upstream of the AP gateway for communications related thereto.

4. The system of claim 1 wherein the AG sets the one or more policies to each differently control wireless communications simultaneously occurring between two or more devices and the AP gateway without the one or more policies each differently controlling destinations upstream of the AP gateway for communications related thereto.

5. The system of claim 1 wherein the AG sets the one or more policies to each control wireless communications occurring between two or more devices and the AP gateway without the one or more policies affecting communications upstream of the AP gateway.

6. The system of claim 1 wherein the AG sets the one or more policies without the AP gateway and the AG identifying a MAC address or other identifier (ID) of devices associated with the data packets.

7. A system for facilitating contextual control of an access point (AP) gateway comprising:

an AP gateway configured to collect contextual awareness data associated with the AP gateway, the contextual awareness data being generated as a function of data packets communicated with the AP gateway;

an access gateway (AG) configured to facilitate control of the AP gateway according to at one or more policies depending of the collected contextual awareness data;

wherein the AP gateway analyzes the contextual awareness data to determine whether a user is present in a dwelling associated with the AP gateway at a selectable instance in time whereupon the AP gateway transmits a present message to the AG if the user is present and an absent message to the AG if the user is absent;

wherein the AG implements a first policy of the one or more policies in response to receipt of the present message and a second policy of the one or more policies in response to receipt of the absent message, the second policy being different than the first policy; and wherein the AP gateway supports a private network and a public network and the first policy allocates more bandwidth to the private network than the public network and the second policy allocates more bandwidth to public network than the public network.

8. A system for facilitating contextual control of an access point (AP) gateway comprising:

an AP gateway configured to collect contextual awareness data associated with the AP gateway, the contextual awareness data being generated as a function of data packets communicated with the AP gateway;

an access gateway (AG) configured to facilitate control of the AP gateway according to at one or more policies depending of the collected contextual awareness data;

wherein the AP gateway analyzes the contextual awareness data to determine whether a user is present in a dwelling associated with the AP gateway at a selectable instance in time whereupon the AP gateway transmits a present message to the AG if the user is present and an absent message to the AG if the user is absent;

wherein the AG implements a first policy of the one or more policies in response to receipt of the present message and a second policy of the one or more policies in response to receipt of the absent message, the second policy being different than the first policy;

wherein the AP getaway determines the user to be present when an associated device is within a wireless range of the AP for a predetermined period of time;

wherein the AP getaway determines whether an identity of the associated device to be one of foreign and non-foreign;

wherein the AG transmits an alert message to a subscriber associated with the AP gateway upon determining the identity to be foreign; and wherein the AG transmits an emergency message to an emergency response entity in the event the subscriber fails to respond to the alert message after a predefined period of time.

9. A system for facilitating contextual control of an access point (AP) gateway comprising:

an AP gateway configured to collect contextual awareness data associated with the AP gateway, the contextual awareness data being generated as a function of data packets communicated with the AP gateway;

an access gateway (AG) configured to facilitate control of the AP gateway according to at one or more policies depending of the collected contextual awareness data;

the AP gateway determines the contextual awareness data as received signal strength indicator (RSSI) data, the RSSI data indicating signaling strength for devices wirelessly communicating data packets over a local area network (LAN) of the AP gateway;

wherein the AP gateway monitors the RSSI data for a period of time;

wherein the AP gateway categorizes the RSSI data indicating device movement during the period of time into a first category and the RSSI data indicating device immobility during the period of time into a second category; and wherein the AG facilitates controlling the AP gateway according to a first policy of the one or more policies when the contextual data is entirely within the first category during the period of time and controlling AP gateway according to a second policy of the one or more policies when the contextual data is entirely within the second category during the period of time.

10. A system for facilitating contextual control of an access point (AP) gateway comprising:

an AP gateway configured to collect contextual awareness data associated with the AP gateway, the contextual awareness data being generated as a function of data packets communicated with the AP gateway;

an access gateway (AG) configured to facilitate control of the AP gateway according to at one or more policies depending of the collected contextual awareness data;

wherein the AP gateway categorizes the contextual awareness data indicative of user presence within a dwelling associated with the LAN into a first category and the contextual awareness data indicative of user absence from the dwelling into the second category; and wherein the AG facilitates controlling the AP gateway according to a first policy of the one or more policies when the contextual data is entirely within the first category and controlling AP gateway according to a second policy of the one or more policies when the contextual data is entirely within the second category, the first and second policies each differently controlling communications between a plurality of devices and the AP gateway.

11. A system for facilitating contextual control of an access point (AP) gateway comprising:

an AP gateway configured to collect contextual awareness data associated with the AP gateway, the contextual awareness data being generated as a function of data packets communicated with the AP gateway;

an access gateway (AG) configured to facilitate control of the AP gateway according to at one or more policies depending of the collected contextual awareness data; and a plurality of sensors in communication with the AP gateway, the plurality of sensors operating to automatically sense conditions independently of manual user inputs thereto such that the AP gateway automatically determines at least a portion of the contextual awareness data based on non-manually generated sensor data obtained with the plurality of sensors.

12. A system for facilitating contextual control of an access point (AP) gateway comprising:

an AP gateway configured to collect contextual awareness data associated with the AP gateway, the contextual awareness data being generated as a function of data packets communicated with the AP gateway;

an access gateway (AG) configured to facilitate control of the AP gateway according to at one or more policies depending of the collected contextual awareness data; and an inspection tool to inspect the data packets without identifying a user and without identifying device associated therewith such that the AG gateway determines at least a portion of the contextual awareness data based on data packet inspection performed on the data packets with the inspection tool without identifying the user and the devices associated therewith.

13. A gateway comprising:
a modem for exchanging data packets with a wide area network (WAN);
a router for exchanging data packets with a local area network (LAN);
a processor; and
a non-transitory computer-readable medium having instructions stored thereon and executable with the processor to facilitate controlling the gateway according to a first policy and a second policy, the instructions being sufficient for:
i) inspecting at least a portion of the data packets exchanged over the LAN to generate inspection information;
ii) determining whether a person is at least one of present within and absent from a dwelling associated with the LAN as a function of inspection information generated with the data packet inspection tool;
iii) controlling the router according to the first policy when the person is present;
iv) controlling the router according to the second policy when the person is absent;
v) defining the first policy to allocate wireless bandwidth made available over the LAN such that a first amount is available for public access and a second amount is available for private access; and
vi) defining the second policy to allocate wireless bandwidth available over the LAN such that a third amount is available for public access and a fourth amount is available for private access, the third amount being greater than the second amount and the fourth amount being less than the second amount.

14. The gateway of claim 13 wherein the instructions are sufficient for:
i) determining received signal strength indicator (RSSI) data for data packets wirelessly exchanged over the LAN;
ii) monitoring the RSSI data for a period of time;
iii) determining the person to be present within the dwelling if the RSSI data indicates device movement for at least one device actively transmitting wireless data packets over the LAN during the period of time;
iv) determining the person to be absent from the dwelling if RSSI data indicates device immobility for each device actively transmitting wireless data packets over the LAN during the period of time.

15. The gateway of claim 13 wherein the instructions are sufficient for:
i) determining traffic type data for data packets carried over the LAN, the traffic type data indicating traffic type for the data packets as at least one of interactive traffic and machine traffic;
ii) monitoring the traffic type data for a period of time;
iii) determining the person to be present within the dwelling if the traffic type data indicates interactive traffic during the period of time;
iv) determining the person to be absent from the dwelling if the traffic type data indicates only machine traffic during the period of time.

16. The gateway of claim 13 wherein the instructions are sufficient for:
i) defining the first policy to optimize data packet transmission over the LAN for interactive data, whereby data packets for interactive data are scheduled for transmission over the LAN before data packets for machine-to-machine data; and
ii) defining the second policy to optimize data packet transmission over the LAN for machine-to-machine data, whereby data packets for machine-to-machine data are scheduled for transmission over the LAN before data packets, if any, for interactive data.

17. The gateway of claim 13 wherein the instructions are sufficient for:
when implementing the first policy, controlling the gateway to transmit a present message to one or more appliances connected to the LAN, the presence message indicating presence of at least one person within the dwelling; and
when implementing the second policy, controlling the gateway to transmit an absent message to one or more appliances connected to the LAN, the absent message indicating absence of any person within the dwelling.

18. A non-transitory computer-readable medium having non-transitory instructions, operable with a processor, to facilitate controlling a gateway according to at least a first policy and a second policy, including instructions sufficient for:
determining received signal strength indicator (RSSI) data for wireless data packets being simultaneously communicated to the gateway from two or more devices within a dwelling associated with the gateway;
controlling the gateway according to the first policy when the RSSI data indicates sufficient signal strength variations for the data packets communicated during a period of time;
controlling the gateway according to the second policy when the RSSI data fails to indicate sufficient signal strength variations for the data packets communicated during the period of time;
when implementing the first policy, controlling the gateway to transmit a present message to one or more appliances connected to the gateway, the presence message indicating presence of at least one person within the dwelling;
when implementing the second policy, controlling the gateway to transmit an absent message to one or more appliances connected to the gateway, the absent message indicating absence of any person within the dwelling;
when implementing the first policy, controlling the gateway to allocate a first amount of bandwidth for public access and a second amount of bandwidth of private access; and
when implementing the first policy, controlling the gateway to allocate a third amount of bandwidth for public access and a fourth amount of bandwidth of private access, the fourth amount being less than the second amount.

* * * * *